(12) United States Patent
Lee

(10) Patent No.: US 6,981,776 B2
(45) Date of Patent: Jan. 3, 2006

(54) BACKLIGHT ASSEMBLY AND LIQUID CRYSTAL DISPLAY HAVING THE SAME

(75) Inventor: Jeong-Hwan Lee, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/886,532

(22) Filed: Jul. 9, 2004

(65) Prior Publication Data
US 2004/0246699 A1 Dec. 9, 2004

Related U.S. Application Data

(63) Continuation of application No. 10/068,918, filed on Feb. 11, 2002, now Pat. No. 6,769,782.

(30) Foreign Application Priority Data
Feb. 21, 2001 (KR) .............................. 2001-008578

(51) Int. Cl.
*F21V 8/00* (2006.01)
(52) U.S. Cl. ....................................... 362/31; 362/561
(58) Field of Classification Search ................. 362/31, 362/561
See application file for complete search history.

(56) References Cited

U.S. PATENT DOCUMENTS

| 5,598,280 | A | 1/1997 | Nishio et al. |
| 6,154,262 | A | 11/2000 | Ogura |
| 6,480,248 | B1 | 11/2002 | Lee et al. |
| 6,486,931 | B1 * | 11/2002 | Ueda ........................... 349/65 |
| 6,788,359 | B2 * | 9/2004 | Lee et al. ..................... 349/65 |

* cited by examiner

*Primary Examiner*—Laura K. Tso
(74) *Attorney, Agent, or Firm*—McGuireWoods LLP

(57) ABSTRACT

A backlight assembly and an LCD having the same are disclosed to prevent wrinklings of optical sheets due to close contact of optical sheets or prism sheets. The backlight assembly includes multiple optical sheets disposed between a light guiding plate and a display unit, for the diffusion of light, collection of light and securing of horizontal viewing angle. The front surface or the rear surface of each of the optical sheets each has an embossing structure or a matte structure to decrease a contact area between the multiple optical sheets and to minimize frictions.

16 Claims, 9 Drawing Sheets

BACKLIGHT ASSEMBLY AND LIQUID CRYSTAL DISPLAY HAVING THE SAME

CROSS REFERENCE

This application is a continuation application of Applicant's U.S. patent application Ser. No. 10/068,918 filed on Feb. 11, 2002 now U.S. Pat. No. 6,769,782.

BACKGROUND OF THE INVENTION

1. Field of the Invention

The present invention relates to a liquid crystal display (LCD), and more particularly, to a backlight assembly and LCD having the same capable of preventing optical sheets from wrinkling due to close stacking of optical sheets or prism sheets employed in the backlight assembly.

2. Description of the Related Art

Generally, LCDs are the representative flat panel display. In order to display an image in these LCDs, an electric power is applied to liquid crystal having a specific molecular configuration to thereby vary the molecular arrangement of liquid crystal. The molecular variations of liquid crystal change optical properties such as birefringence, rotary polarization, dichroism and light scattering. The LCDs converts the optical property changes into the variations in the visual properties, thereby displaying a desired image.

LCDs are generally classified into two types according to liquid crystal used: a twisted nematic (TN) type; and a super-twisted nematic (STN) type. These LCDs are also classified into an active matrix display type using switching devices and TN liquid crystal, and a passive matrix display type using STN liquid crystal according to a difference in the driving way.

The two typed LCDs have apparent difference. The active matrix type display is employed in TFT-LCDs utilizing thin film transistors (TFT) as switching element. The passive matrix display does not utilize TFT as switching element. In other words, the passive matrix display does not need complicated circuits such as TFTs.

LCDs are passive device that does not emit light by itself. Thus, LCDs need a backlight assembly as light source to display images. This backlight assembly is established at the rear surface of the LCD panel.

Recently, in order to secure the competitiveness of LCD products, LCDs are being developed in a slimmer and lighter structure. Especially, considering that the LCDs are mainly used for portable computers, the present LCDs deal with lightness more significantly.

In these LCDs, present interests are especially focused on roles and functions of the backlight assembly. This is because size and light efficiency of LCDs become different and mechanical and optical properties are affected depending on the LCD structure to a considerable degree.

There is disclosed a structure of a general backlight assembly used in these LCDs in U.S. Pat. No. 5,467,208.

FIG. 1 is a simplified exploded perspective view of a conventional LCD having the backlight assembly, and FIGS. 2 and 3 are simplified sectional views of the backlight assembly of FIG. 1.

Referring to FIGS. 1 and 2, a backlight assembly includes a lamp 12 for emitting a light, a light guiding plate 20 for guiding the light emitted from the lamp 12, and a lamp cover 14 established at one side of the light guiding plate 20, for surrounding the lamp 12.

As the lamp 12, a cold cathode lamp is mainly used. Light generated from the lamp 12 is incident through a side wall of the light guiding plate 20. Inner surface of the lamp cover 14 is made of a reflector plate. The light guiding plate 20 reflects light generated from the lamp 12, thereby enhancing a light efficiency.

The light guiding plate 20 guides the light generated from the lamp 12 to proceed toward an LCD panel 15 mounted thereon. The light guiding plate 20 includes various patterns such as a fine dot pattern (not shown) formed on the rear surface thereof to convert a light proceeding direction toward the LCD panel 15.

A reflector plate 22 is disposed beneath the light guiding plate 20 and a diffusion sheet 32, a first prism sheet 34, a second prism sheet 36 and a protective film 38 are placed in such an order on the light guiding plate 20.

The reflector plate 22 reflects light beams that are not reflected by the printed patterns of the light guiding plate 20 and leak, toward the light guiding plate 20, thereby reducing loss of incident light to the LCD panel 15 and simultaneously enhancing the uniformity of light beams passing through the light guiding plate 20 upward.

The diffusion sheet 32 is placed between the light guiding plate 20 and the first prism sheet 34 and disperses the light incident from the light guiding plate 20, to thereby prevent a partial concentration of light beams. A plurality of beads 32a and 32b are formed on the front surface and the rear surface of the diffusion sheet 32, and they make uniform the light flux distribution of light beams reflected from the reflector plate 22.

The first prism sheet 34 and the second prism sheet 36 are stacked in the named order on the diffusion sheet 32 and they each have a plurality of triangle prisms at the front surface thereof. The first prism sheet 34 and the second prism sheet 36 collect light beams diffused by the diffusion sheet 32 toward a first and second direction normal to a plane parallel to the LCD panel 40 in order to make a viewing angle narrow, thereby enhancing the brightness at the front side.

The protective film 38 is placed between the second prism sheet 36 and the LCD panel 40 to protect the front surface of the second prism sheet 36. The protective film 38 has a plurality of acryl beads 38a formed at the front surface thereof, to prevent moiré phenomenon and rainbow phenomenon. Thus, the light beams generated from the lamp 20 and then passing through multiple optical sheets show images formed by the LCD panel 40.

Meanwhile, when the horizontal viewing angle is important, there is widely used a backlight assembly structure utilizing only either one of the first prism sheet or the second prism sheet having a light collection characteristic and for enhancing the luminance at the front side. In this case, a reflection polarization film is used, which improves a luminance lowering per viewing angles due to the lack of one prism sheet, increases the luminance of the light through the entire surface of the prism sheet and enhances the luminance characteristics every viewing angles.

FIG. 3 shows an example of a backlight assembly having only one prism sheet and a reflection polarization film for improving the brightness characteristic from every viewing angle is also used.

As shown in FIG. 3, a reflection polarization film 39 is placed between the first prism sheet 34 and the protective film 38. The reflection polarization film 39 has smooth front surface in contact with the protective film 38 and smooth rear surface in contact with the first prism sheet 34.

However, the aforementioned conventional backlight assemblies have the following drawbacks. First, since the prisms formed at the front surface of the prism sheet have a shape of ridge, optical sheets wrinkle due to close stacking of another prism sheet or the reflection polarization film.

Second, when a single prism sheet and the reflection polarization film are employed, a contact area is widened between the reflection polarization film and the underlying prism sheet and between the reflection polarization film and the overlying protective film, increasing a friction coefficient. As a result, curl occurs between optical sheets.

Third, since the optical sheets are of compound resin, electrostatic current is easily generated. The electrostatic current allows the optical sheets to be closely attached to each other, however, creating wrinkles between optical sheets.

SUMMARY OF THE INVENTION

Accordingly, it is an object of the present invention to provide a backlight assembly that can prevent optical sheets and/or prism sheet employed in the backlight assembly from wrinkling due to close contact between the sheets.

It is another object of the present invention to provide an LCD that can prevent optical sheets and/or prism sheet employed in the backlight assembly from wrinkling due to close contact between the sheets.

To accomplish the above objects, a backlight assembly comprises a light generating part for generating a light, a light guiding part for guiding the generated light to a display unit displaying an image, and a light control part disposed between the light guiding plate and the display unit for enhancing a brightness of the light passing through the light guiding part. Here, the light control part has a front surface facing the display unit and a rear surface facing the light guiding part, at least one of the front surface and the rear surface of the light control part being not flat.

According to another aspect of the present invention, an LCD comprises a display unit having an LCD panel for displaying an image using a provided light, and a backlight assembly comprising a light generating part for generating a light, a light guiding part for guiding the generated light to a display unit displaying an image, and a light control part disposed between the light guiding plate and the display unit for enhancing a brightness of the light passing through the light guiding part. Here, the light control part has a front surface facing the display unit and a rear surface facing the light guiding part, at least one of the front surface and the rear surface of the light control part being not flat.

Here, the light control part is a reflection polarization film for enhancing the brightness of the light passing through the light guiding part. The reflection polarization film has a front surface established closely in direct contact with the display unit and having a mat shape, and a rear surface having an embossing shape.

BRIEF DESCRIPTION OF THE DRAWINGS

The above objects and other advantages of the present invention will become more apparent by describing in detail the preferred embodiments thereof with reference to the accompanying drawings.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein.

Figure 1:
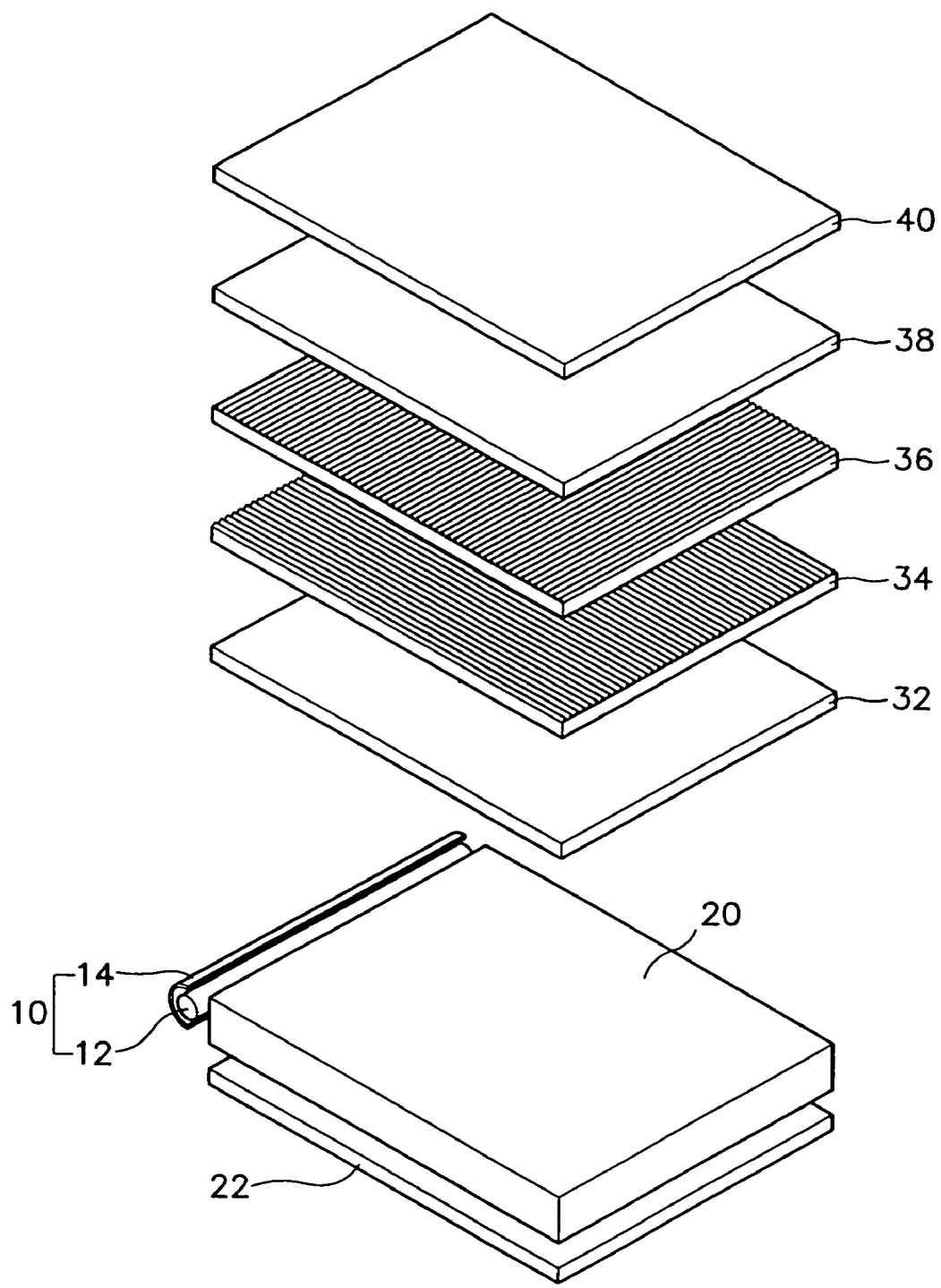
FIG. 1 is a simplified exploded perspective view of an LCD having a backlight assembly in accordance with the conventional art.
Figure 2:
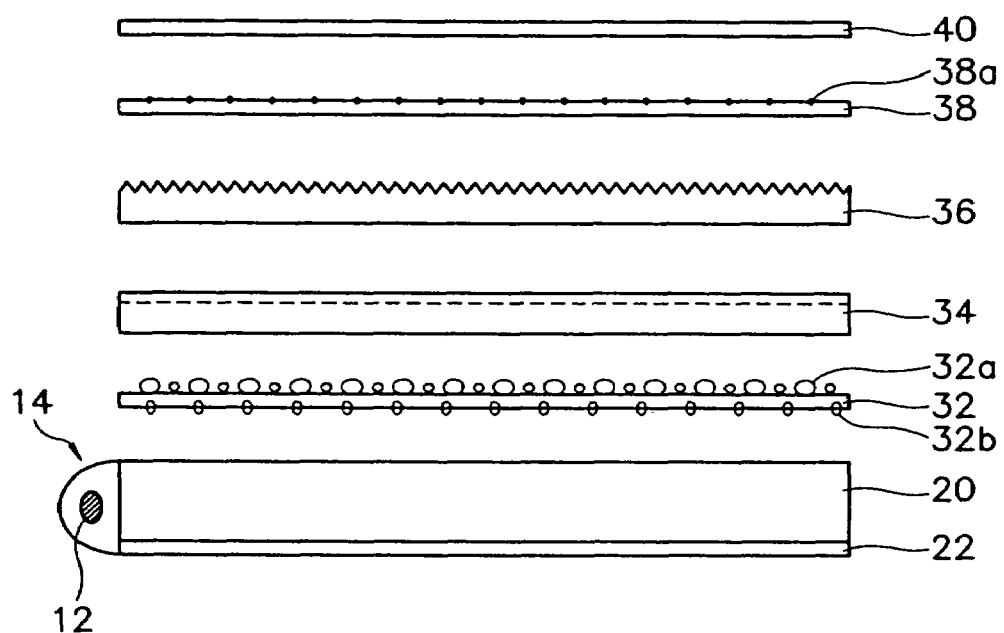
FIG. 2 is a simplified schematic view of one example of optical sheets in the backlight assembly of FIG. 1.
Figure 3:
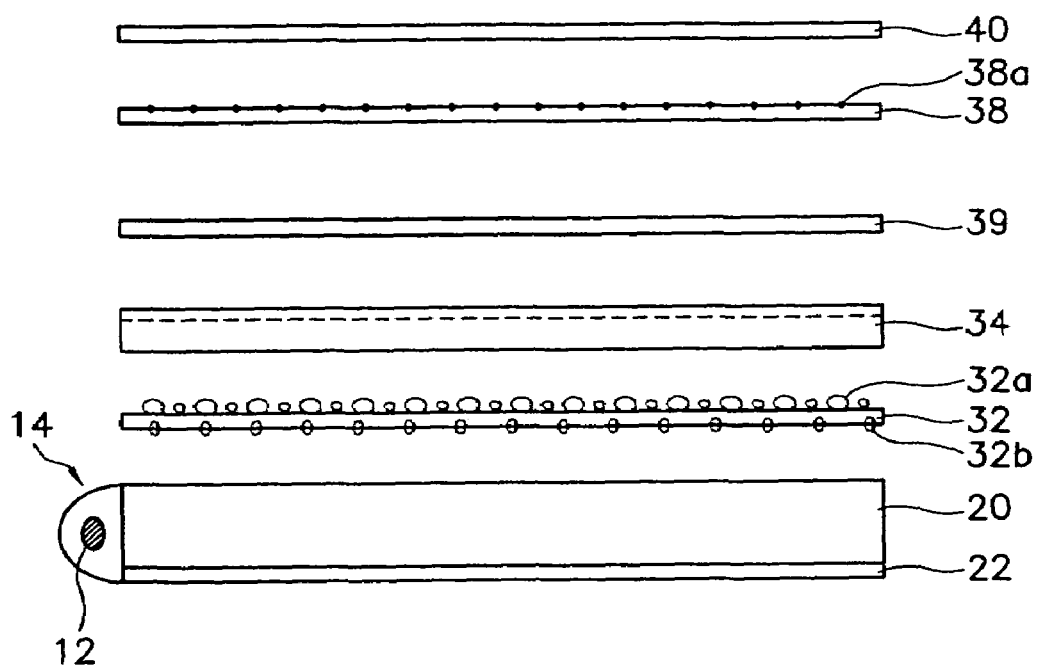
FIG. 3 is a simplified schematic view of another example of optical sheets in the backlight assembly of FIG. 1.
Figure 4:
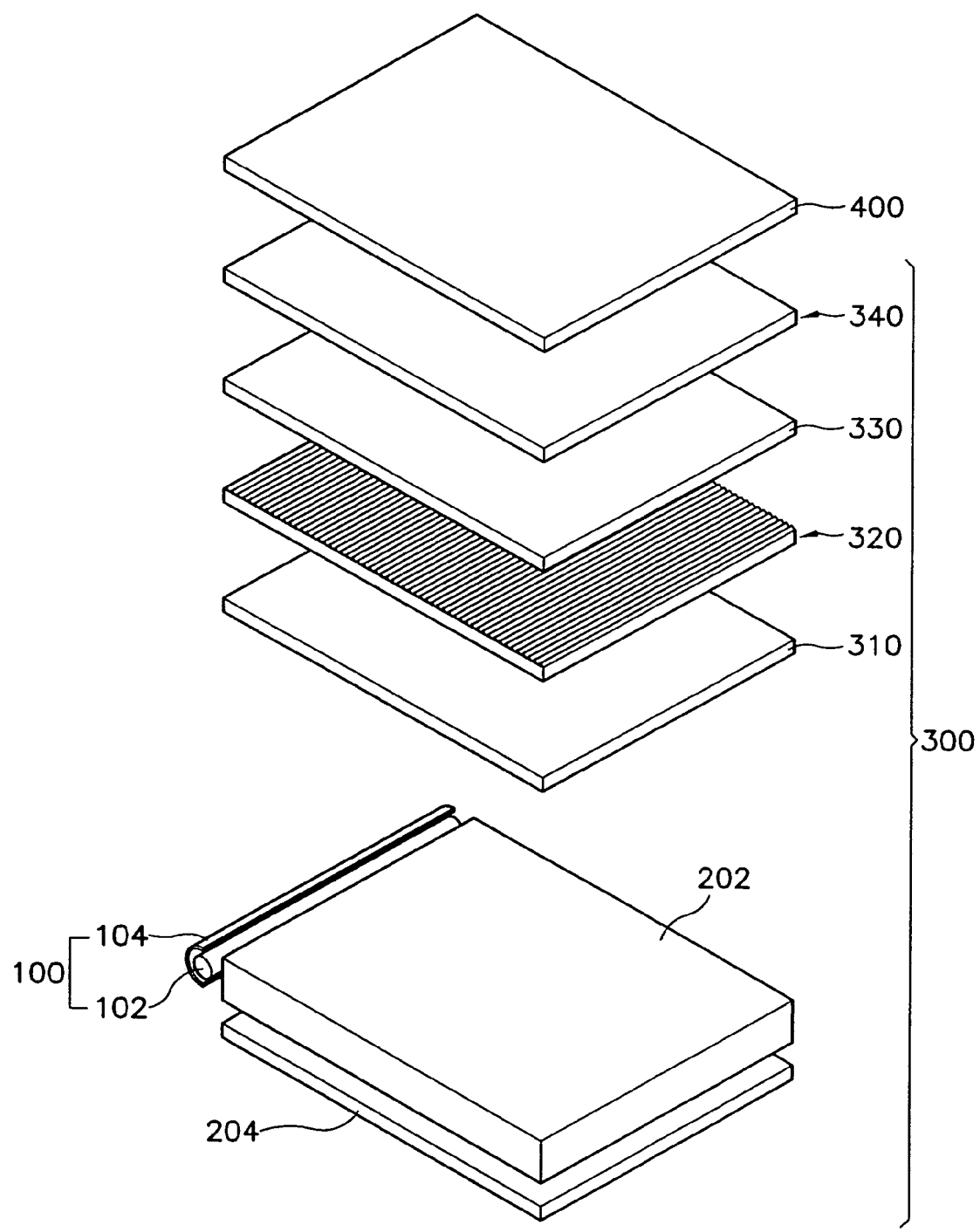
FIG. 4 is a simplified exploded perspective view of an LCD having a backlight assembly in accordance with a preferred embodiment of the present invention.

FIG. 4 is a simplified exploded perspective view of an LCD having a backlight assembly in accordance with a preferred embodiment of the present invention. FIG. 4 shows an embodiment in which a single prism sheet and a reflection polarization film are employed. It is evident, however, the present invention embraces such modifications and variations in which two prism sheets are used along with the reflection polarization film as described later.

Referring to FIG. 4, a backlight assembly in accordance with the present invention has a lamp unit 100 and a light guiding unit 300. The lamp unit 100 includes a lamp 102 for emitting a light and a lamp cover 104 surrounding the lamp 102 to protect the lamp 102 and reflecting the light generated from the lamp 102 toward the light guiding unit 300, to thereby enhance a light efficiency. As the lamp 102, a cold cathode lamp is mainly used.

The light guiding unit 300 includes a light guiding plate 202 for guiding the light emitted from the lamp 102. A reflector plate 204 is disposed beneath the light guiding plate 202. A diffusion sheet 310, a first prism sheet 320, a first reflection polarization film 330 and a protective film 340 are placed in the named order on the light guiding plate 202.

On the protective film 340, there is disposed an LCD panel 400 for displaying an image in response to the light that is guided by the light guiding plate 202 and provided through a plurality of optical sheets.

The lamp 102 and the lamp cover 104 are disposed adjacent to one side wall of the light guiding plate 202. The light guiding plate 202 guides the light generated from the lamp 102 such that the light proceeds to the LCD panel 400 disposed over the light guiding plate 202. On the rear surface of the light guiding plate 202, there are formed various patterns such as a fine dot pattern (not shown in the drawings) so as to convert the light proceeding direction provided from the lamp 102 toward the LCD panel 400.

The reflector plate 204 reflects the light that is not reflected toward the LCD panel 400 and leaks, toward the light guiding plate 202. Thus, loss of input light to the LCD panel 400 is minimized. At the same time, it enhances uniformity of light passing through the light guiding plate 202.

The diffusion sheet 310 disposed between the light guiding plate 202 and the first prism sheet 320 disperses the light that is incident to the light guiding plate 202, thereby preventing partial concentration of the light. Although not shown in FIG. 4, a plurality of beads 312 and 314 are formed at the front and rear surface of the diffusion sheet 310, thereby making uniform a light flux distribution of the light reflected from the reflector plate 204.

A plurality of triangle prisms are formed at the front surface of the first prism sheet 320 disposed on the diffusion sheet 310. The fist prism sheet collects light beams diffused by the diffusion sheet 310 toward a specific direction normal to a plane parallel to the LCD panel 400 in order to make a viewing angle narrow and thereby enhance the brightness at the front side.

The first reflection polarization film 330 and the protective film 340 are placed between the first prism sheet 320 and the LCD panel 400.

The first reflection polarization film 330 increases the brightness of the light collected by the first prism sheet 320 uniformly in order to improve the brightness every horizontal viewing angles of the LCD panel 400.

The protective film 340 protects the surfaces of the optical sheets disposed below the protective film 340. Also, the protective film 340 has a plurality of acryl beads (not shown in FIG. 4) formed at the front surface, thereby preventing occurrences of moiré phenomenon and rainbow phenomenon that may be caused by the first prism sheet 320. Thus, the light beams that are generated from the lamp 102 and then pass through multiple optical sheets show images formed by the LCD panel 400. Meanwhile, the front surface and the rear surface of the reflection polarization film 340 can be made to have a mat shape and an embossing shape, respectively. They will be fully described with reference to the following drawings.

FIG. 5 through FIG. 9 show various structures of the backlight assembly provided in FIG. 4.

Figure 5:
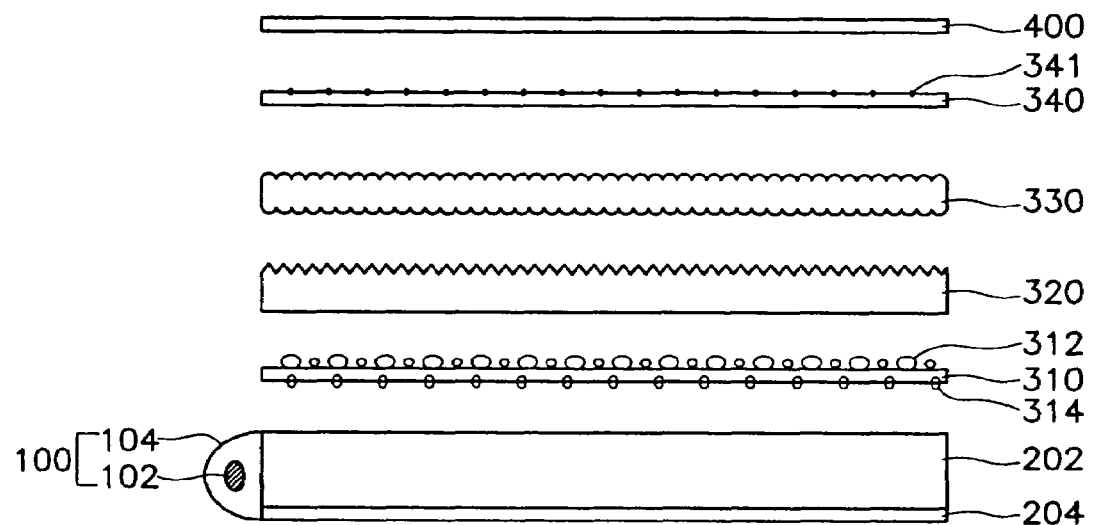
FIG. 5 through FIG. 9 are schematic views showing various structures of optical sheets in the backlight assembly of FIG. 4.

Referring to FIG. 5, the diffusion sheet 310, the first prism sheet 320, the first reflection polarization film 330 and the protective film 340 are stacked in the named order on the light guiding plate 202. The plurality of beads 312 and 314 are formed at the front and rear surfaces of the diffusion sheet 310 so as to uniformly distribute light flux in the light reflected from the reflector plate 204.

Also, the front surface of the protective film 340 has a matte structure to prevent moiré phenomenon by the first prism sheet. The first reflection polarization film 330 has the front surface and the rear surface each having an irregular surface of an embossing structure.

As the front surface and the rear surface of the first reflection polarization film 330 are made to have the embossing structure, a contact area decreases to a remarkable degree between the front surface of the first reflection polarization film 330 and the rear surface of the protective film 340 and a contact area between the rear surface of the first reflection polarization film 330 and the front surface of the first prism sheet 320.

Accordingly, friction occurring between the front surface of the first reflection polarization film 330 and the rear surface of the protective film 340 and friction occurring between the rear surface of the first reflection polarization film 330 and the front surface of the first prism sheet 320 decrease to a remarkable degree. This prevents the wrinkling of the optical sheets disposed between the light guiding plate 202 and the LCD panel 400.

Figure 6:
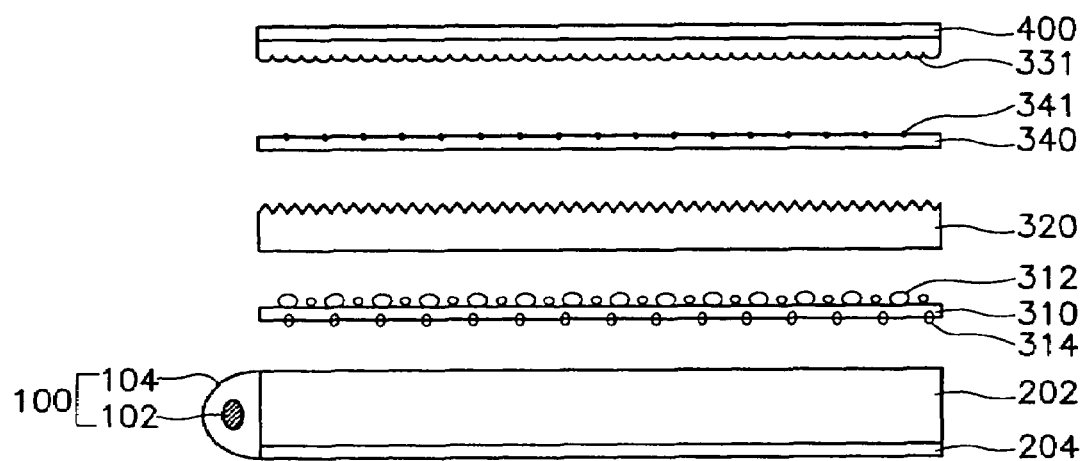

FIG. 6 shows a backlight assembly having a reflection polarization film 331 (hereinafter referred to as "second reflection polarization film") that is different than the first reflection polarization film 330 shown in FIG. 5.

The second reflection polarization film 331 shown in FIG. 6 is made integrally with the LCD panel 400. At this time, the protective film 340 is disposed between the second reflection polarization film 331 and the first prism sheet 320.

Thus, as the second reflection polarization film 331 is made integrally with the LCD panel 400, the rear surface of the second reflection polarization film 330 has an embossing structure. As a result, it prevents the curl of the optical sheets due to the close contact between the protective film 340 and the second reflection polarization film 331.

In the meanwhile, the protective film 340 used for protecting the surfaces of the optical sheets and preventing moiré phenomenon and rainbow phenomenon can be removed when the first reflection polarization film 330 of FIG. 5 is made to have the same structure than that of a reflection polarization film (hereinafter referred to as "third reflection polarization film") shown in FIG. 7.

Figure 7:
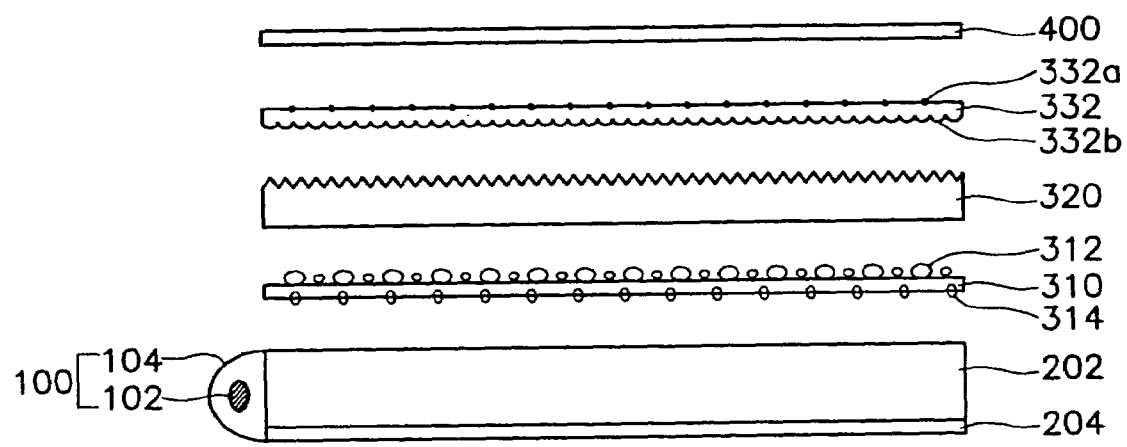

In other words, referring to FIG. 7, between the light guiding plate 202 and the LCD panel 400, there are disposed the diffusion sheet 310, the first prism sheet 320 and a third reflection polarization film 332. Likewise, a plurality of beads 312 and 314 are formed at the front and rear surfaces of the diffusion sheet 310 in order to uniformly distribute the light flux of the light reflected from the reflector plate 204.

The rear surface of the third reflection polarization film 332 is formed to have an embossing structure in order to prevent a close contact with the underlying first prism sheet, and the front surface of the third reflection polarization film 332 is formed to have a matte structure. Thus, the matte structure of the front surface of the third reflection polarization film prevents the moiré phenomenon and rainbow phenomenon.

Figure 8:
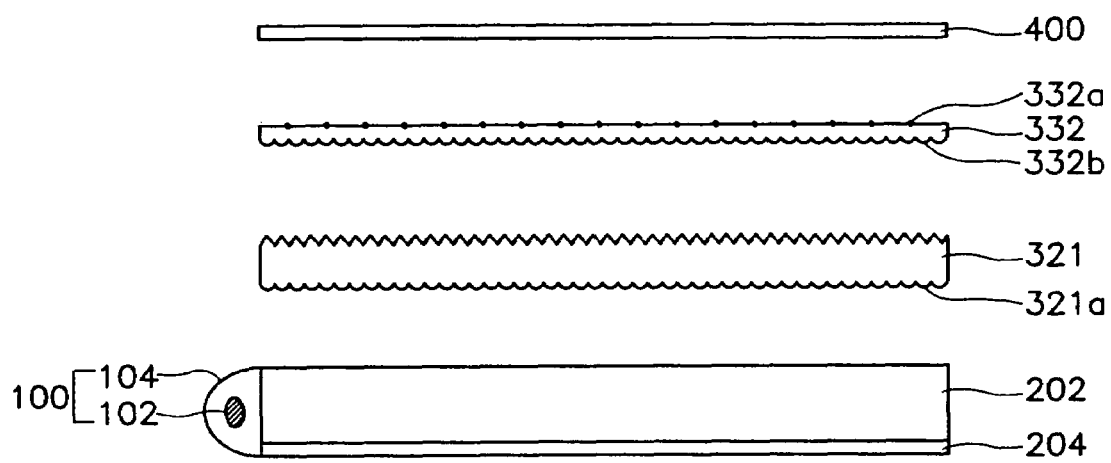
Figure 9:
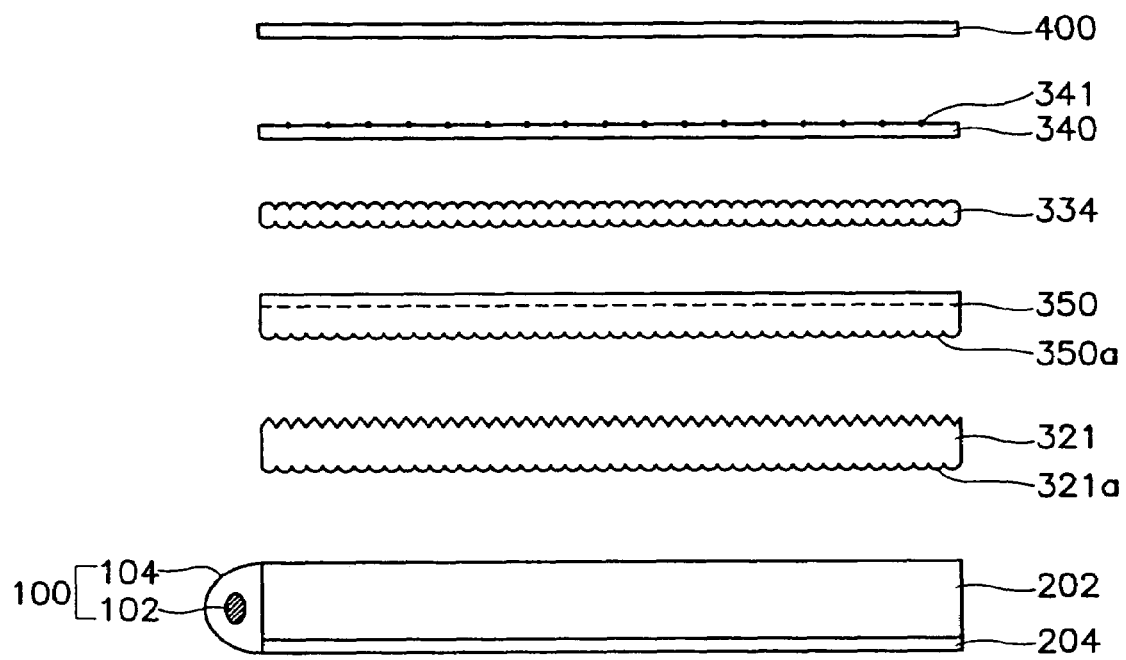

Unlike the close contact between the reflection polarization film and the remaining optical sheets, the optical sheets in the backlight assembly may wrinkle due to the close contact between the prism sheets. Especially, when at least two prism sheets are used or the aforementioned diffusion sheet is not used, this curl may occur frequently. A surface structure of a prism sheet capable of preventing such a curl is shown in FIG. 8 and FIG. 9. The surface structures of the prism sheets provided in FIG. 8 and FIG. 9 can be equally applied to the first prism sheet shown in FIG. 5 through FIG. 7.

Referring to FIG. 8, between the light guiding plate 202 and the LCD panel 400, there are disposed a second prism sheet 321 modified from the first prism sheet 320 shown in FIG. 7 and the third reflection polarization film 332. In other words, the second prism sheet 321 is mounted on the front surface of the light guiding plate 202 such that it directly, closely contacts the front surface of the light guiding plate 202.

The rear surface of the third reflection polarization film 332 is formed to have an embossing structure 332b in order to prevent a close contact with the front surface of the second prism sheet 321. And the front surface of the third reflection polarization film 332 is formed to have a matte structure 332a in order to prevent the moiré phenomenon and rainbow phenomenon. Likewise, the rear surface of the second prism sheet 321 has an embossing structure 321a in order to reduce the contact area with the light guiding plate 202. Thus, since the contact area between the second prism sheet 321 and the light guiding plate 202 decrease to a considerable degree by closely contacting the second prism sheet 321 directly with the front surface of the light guiding plate 202 without using the diffusion sheet, a curl between them can be prevented.

FIG. 9 shows a backlight assembly that uses two prism sheets and protective film, but not a diffusion sheet.

Referring to FIG. 9, between the light guiding plate 202 and the LCD panel 400, there are disposed the second prism sheet 321, a third prism sheet 350, a fourth reflection polarization film 334 and the protective film 340.

The rear surface of the second prism sheet 321a has an embossing structure 321a in order to decrease the area contacting the light guiding plate 202. The rear surface of the third prism sheet 350 has an embossing structure 350a in order to decrease the area contacting the prisms formed at the front surface of the second prism sheet 321.

Like the first reflection polarization film 340, the front and rear surfaces of the fourth reflection polarization film 334 have an embossing structure in order to decrease the areas contacting the protective film 340 and the third prism sheet 350, respectively. Also, each of the protective film disposed between the fourth reflection polarization film 334 and the LCD panel 400 has a front surface of a matte structure 341 in order to prevent moiré phenomenon and rainbow phenomenon due to the second and third prism sheets 321 and 350.

Like the third reflection polarization film 332 shown in FIG. 7 and FIG. 8, respectively, when the fourth reflection polarization film 334 has a rear surface of the embossing structure and a front surface of the matte structure, the protective film 340 of FIG. 9 can be omitted.

As described above, the reflection polarization film in the backlight assembly and the LCD of the present invention is made to have the front surface of the embossing structure and the rear surface of the matte structure. Also, the prism sheet is formed to have the rear surface of the embossing structure. As a result, a contact area between the plurality of optical sheets disposed between the light guiding plate and the LCD panel decreases and the friction also decreases, thereby preventing curl of the optical sheets due to the close contact of the optical sheets.

In addition, when the front surface of the reflection polarization film has a matte structure, the reflection polarization film prevents moiré phenomenon and rainbow phenomenon caused by the prism sheet, and thereby the protective film can be omitted from the backlight assembly. Moreover, when the rear surface of the prism sheet has an embossing structure, the prism sheet can prevent curl of the prism sheet generated by closely contacting the prism sheet directly with the light guiding plate although the diffusion sheet is omitted.

This invention has been described above with reference to the aforementioned embodiments. It is evident, however, that many alternative modifications and variations will be apparent to those having skills in the art in light of the foregoing description. Accordingly, the present invention embraces all such alternative modifications and variations as fall within the spirit and scope of the appended claims.

What is claimed is:

1. A backlight assembly, comprising:
a light generator that generates a light;
an optical sheet disposed on the light generator so as to diffuse the light from the light generator and provide the diffused light to a display unit; and
a reflection polarization film disposed between the optical sheet and the display unit so as to enhance brightness of the light provided to the display unit from the light generator through the optical sheet,
wherein the reflection polarization film has a front surface facing the display unit and a rear surface facing the optical sheet, at least one of the front surface and the rear surface of the reflection polarization film being non-flat.

2. The backlight assembly of claim 1, wherein the front surface of the reflection polarization film is in close and direct contact with the display unit.

3. The backlight assembly of claim 2, wherein at least one of the front surface and the rear surface of the reflection polarization film have a matte structure or an embossing structure.

4. The backlight assembly of claim 3, wherein the front surface of the reflection polarization film has the matte structure and the rear surface of the reflection polarization film has the embossing structure.

5. The backlight assembly of claim 1, wherein the optical sheet comprises at least one prism film disposed between the reflection polarization film and the light generator so as to enhance the efficiency of collecting the light from the light generator.

6. The backlight assembly of claim 5, wherein the prism film has a facing surface facing the reflection polarization film and the facing surface has a matte structure or an embossing structure.

7. The backlight assembly of claim 1, further comprising a protective sheet disposed between the reflection polarization film and the display unit so as to prevent interference of the light.

8. The backlight assembly of claim 7, wherein the front surface and the rear surface of the reflection polarization film have the embossing structure.

9. A liquid crystal display device, comprising:
a display unit having a liquid crystal display panel that displays an image; and
a backlight assembly, comprising:
a light generator that generates a light;
an optical sheet disposed on the light generator so as to diffuse the light from the light generator and provide the diffused light to a display unit; and
a reflection polarization film disposed between the optical sheet and the display unit so as to enhance brightness of the light provided to the display unit from the light generator through the optical sheet,
wherein the reflection polarization film has a front surface facing the display unit and a rear surface facing the optical sheet, at least one of the front surface and the rear surface of the reflection polarization film being not flat.

10. The liquid crystal display device of claim 9, wherein the front surface of the reflection polarization film is in close and direct contact with the display unit.

11. The liquid crystal display device of claim 10, wherein the front surface and the rear surface of the reflection polarization film have a matte structure or an embossing structure.

12. The liquid crystal display device of claim 10, wherein the front surface of the reflection polarization film has the matte structure and the rear surface of the reflection polarization film has the embossing structure.

13. The liquid crystal display device of claim 9, wherein the optical sheet comprises at least one prism film disposed between the reflection polarization film and the light generator, the prism film enhancing the efficiency of collecting the light generated from the light generator.

14. The liquid crystal display device of claim 13, wherein the prism film has a facing surface facing the reflection polarization film and the facing surface has a matte structure or an embossing structure.

15. The liquid crystal display device of claim 9, further comprising a protective sheet disposed between the reflection polarization film and the display unit so as to prevent interference of the light.

16. The liquid crystal display device of claim 15, wherein the front surface and the rear surface of the reflection polarization film have an embossing structure.

* * * * *